United States Patent [19]

Okada et al.

[11] Patent Number: 4,563,954
[45] Date of Patent: Jan. 14, 1986

[54] FOUR-WHEELED ADJUSTABLE VEHICLE

[75] Inventors: Tokuji Okada; Takeo Kanade, both of Pittsburgh, Pa.

[73] Assignee: Carnegie-Mellon University, Pittsburgh, Pa.

[21] Appl. No.: 540,178

[22] Filed: Oct. 11, 1983

[51] Int. Cl.⁴ .............................................. B61B 13/10
[52] U.S. Cl. .................................. 104/138 G; 105/365
[58] Field of Search ............... 104/138 R, 138 G, 155; 105/365; 378/60; 250/358.1; 15/104.03, 104.05, 104.3 R; 33/1 H, 178 F; 73/40, 40.5 R, 40.5 A; 134/166 C, 167 C, 168 C, 169 C; 254/134.5, 134.3 FT; 118/105, 254, 306, 317, 408, 622, DIG. 10; 72/466; 324/220, 221

[56] References Cited

U.S. PATENT DOCUMENTS

| | | | |
|---|---|---|---|
| 1,177,984 | 4/1916 | Beene | 254/134.5 |
| 2,897,779 | 8/1959 | Perkins | 15/104.05 X |
| 3,078,823 | 2/1963 | Cummings et al. | 118/306 |

*Primary Examiner*—Randolph A. Reese
*Attorney, Agent, or Firm*—Buell, Ziesenheim, Beck & Alstadt

[57] ABSTRACT

A motor driven vehicle for traversing the interior of a pipe or conduit accommodates itself to variations in the interior contour of the pipe and automatically positions itself on the longest axis of any cross section of the pipe. It comprises a pair of two-wheeled trucks each pivotally connected to an end of a stretcher member which urges the trucks away from each other against diametrically opposite paths of travel on the pipe wall. Each truck has a driving wheel and a swivelling wheel, the driving wheels being diagonally opposite each other. The driving wheel motors are servo-connected so as to keep the angles between stretcher and truck bolsters equal. The driving wheels are preferably constructed with rim segments which rotate about axes tangent to the mean circumference of the rim, thereby permitting movement sidewise of the wheel.

7 Claims, 5 Drawing Figures

FOUR-WHEELED ADJUSTABLE VEHICLE

The government of the United States of America has rights in this invention pursuant to Contract No. N00014-81-K-0503 awarded by the Office of Naval Research.

This invention relates to a vehicle for traversing the interior of long pipes or conduits. It is more particularly concerned with self-propelled apparatus that adjusts itself to the shape of pipe not truly circular and to the size of the pipe.

BACKGROUND OF THE INVENTION

It is necessary to make periodic inspections of the interior of pipe and conduits carrying hazardous fluids and other fluids leakage of which cannot be tolerated. Pipes and conduits of appropriate size have been inspected by various types of devices which travel or are propelled through the pipes, carrying cameras or other inspection devices. It is not unduly difficult to design such a vehicle for a truly circular pipe of fixed diameter as it can propel itself by traction along geometrically opposite areas of the pipe wall. However, ideal conditions are seldom found in pipe lines and conduits, particularly at bends. Furthermore, prior art vehicles have difficulty maintaining traction on inclined surfaces against the pull of gravity.

SUMMARY OF THE INVENTION

Our vehicle to be described in detail hereinafter accommodates itself to variations in the interior contour of the pipe and automatically positions itself on the longest axis of any cross section of the pipe. It comprises a pair of two-wheeled trucks each pivotally connected to an end of a stretcher member which urges the trucks away from each other against diametrically opposite paths of travel on the pipe wall. Each truck has a driving wheel and a swivelling wheel, the driving wheels being diagonally opposite each other. The driving wheels are preferably constructed to permit movement sidewise of the wheel thereby enhancing their ability to position our vehicle for maximum traction.

DESCRIPTION OF PREFERRED EMBODIMENT

Figure 1:
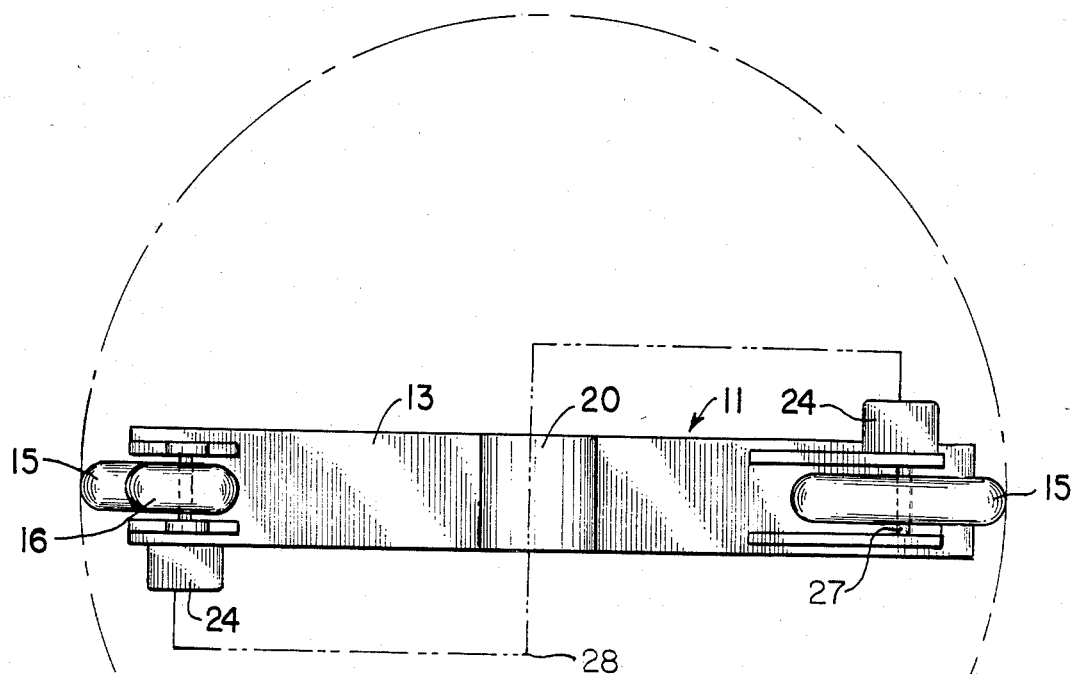
FIG. 1 is a view of our apparatus taken crosswise of a pipe.
Figure 2:
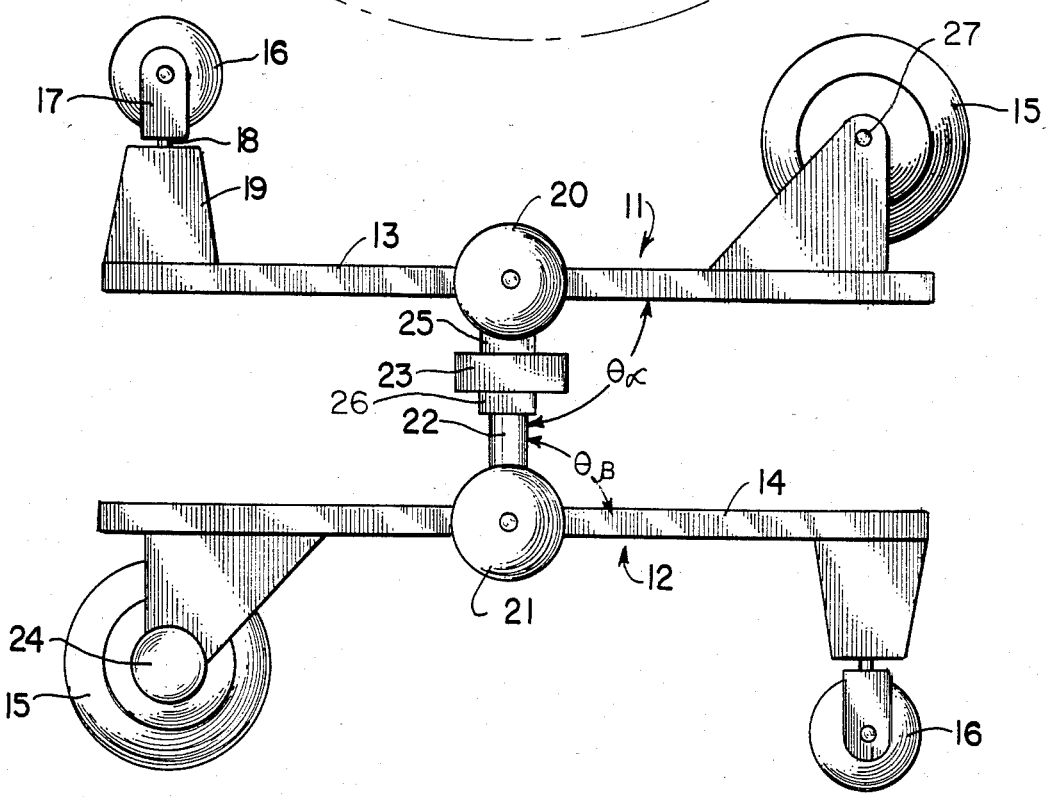
FIG. 2 is an elevation of the apparatus of FIG. 1.

Our vehicle comprises identical trucks 11 and 12. Truck 11 comprehends an elongated bolster 13 at one end of which is mounted a driving wheel 15 and at the other end a swivelling wheel 16. The latter is journalled in a clevis 17 which swivels on shaft 18 at the outer end pedestal 19 which is attached to bolster 13. Both wheels are mounted on the same face of bolster 13. Truck 12 comprises a like elongated bolster 14 which carries a driving wheel 15 and a swivelling wheel 16 at opposite ends, those wheels being identical with wheels 15 and 16 and mounted in the same way. At the center of bolster 13 is a free pivotal joint 20 on which truck 11 pivots about a stretcher member 25 which telescopes over member 22 and includes a compression spring or like means 26 which urges member 22 away from member 25. The latter member may optionally include mechanism which adjusts the overall length of members 22 and 25. At the center of bolster 14 is a like free pivotal joint 21 on which truck 12 pivots about the outer end of member 22. The driving wheels 15 of truck 11 and 12 are diagonally opposite each other and are driven by motors 24 which are carried by their respective bolsters and are coupled to drive shafts 27. In our vehicle as above described both driving wheels 15 lie in the same plane and member 22 does not rotate with respect to member 25 about their common axis. Optionally, however, our vehicle may be provided with means 23 carried by member 25 for rotating that member with respect to member 22. Both driving wheel motors 24 are servo-connected, at 28, so as to bring the angle between the common axis of stretcher members 22 and 25 and the driving wheel 15 end of bolster 13, as shown as $\theta_\alpha$, in FIG. 2 equal to the angle between the stretcher member axis and the swivelling wheel 16 end of bolster 14, $\theta_\beta$.

Figure 3:
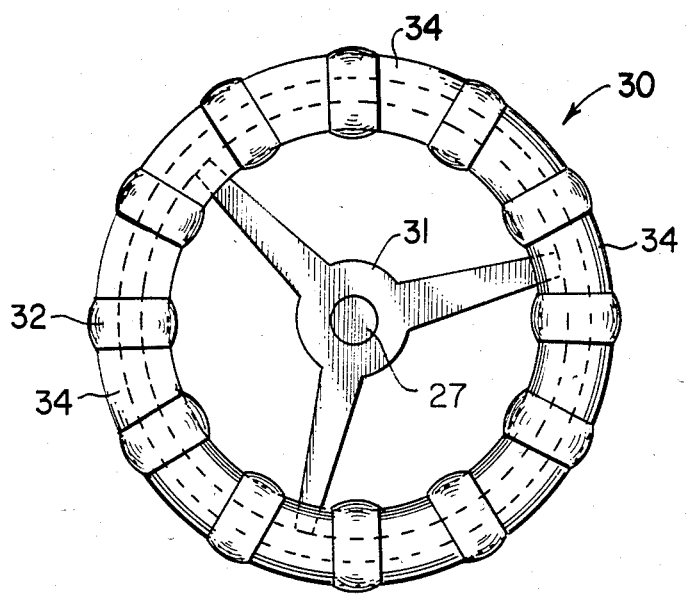
FIG. 3 is an elevation of the drive wheel of our apparatus shown in more detail.
Figure 5:
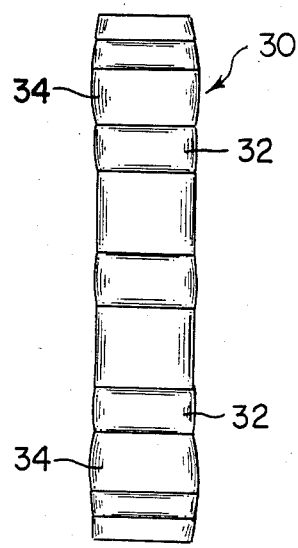
FIG. 5 is an end elevation of the wheel of FIG. 3.
Figure 4:
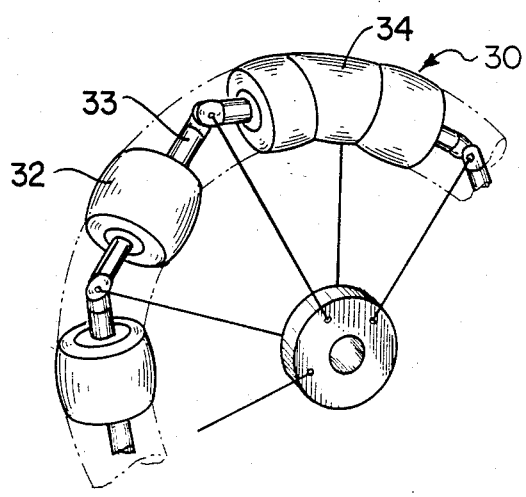
FIG. 4 is a cut-away detail of the wheel of FIG. 3 showing the structure of the wheel rim.

The driving wheels 15 of our vehicle are shown in detail in FIGS. 3, 4 and 5. They comprise a rim 30 and a spider 31 having shaft 27 at its center. Rim 30 consists of a series of rollers 32 each of which rotates freely about its shaft 33. Shafts 33 of successive rollers 32 are joined at their ends, as is best shown in FIG. 4. The space between the ends of adjoining rollers 32 is filled by spacers 34 which surround the joined ends of shafts 33 and, of course, do not rotate. Shafts 33 are tangent to the median circumference of rim 30. Freely rotating rollers 32 allow each drive wheel 15 to move normal to its plane but do not impair its traction in that plane.

In operation of our vehicle one of the driving wheels 15 is controlled for driving. Of course, two driving wheels may be controlled at the same time for driving. Pivotal joint 20 of truck 11 and pivotal joint 21 of truck 12 are allowed to rotate freely as determined by the pipe contour. Angles $\theta_\alpha$ and $\theta_{62}$ therefore change as our vehicle moves. If the wheel 15 of truck 11 rotates actively, we servo-control the diagonally opposite driving wheel 15 of truck 12 so that angle $\theta_\beta$ follows angle $\theta_\alpha$. Should the magnitude $\theta_\alpha - \theta_\beta$ be negative, the wheel 15 of truck 12 is controlled to rotate counter-clockwise and vice-versa. If the value of $\theta_\alpha - \theta_\beta$ is zero driving wheel 15 of truck 12 does not rotate at all. Under the above conditions balance of our vehicle in the pipe is dependent on the friction of the treads of driving wheels 15 on the pipe. When $\theta_\alpha = \theta_\beta$ and driving wheel 15 of truck 12 stops rotating, our vehicle is prevented from slipping down the pipe.

Bolsters 13 and 14 can become parallel to the axis of the pipe only when the leading wheels in the direction of motion are able to move sidewise freely. If wheels 15 are of conventional structure they cannot move in that way. The wheels illustrated in FIGS. 3, 4 and 5 however, can move both in the plane of the wheel and also normal thereto.

In the foregoing specification, we have described a presently preferred embodiment of our invention; however, it will be understood that our invention can be otherwise embodied within the scope of the following claims.

We claim:

1. A vehicle for automatically traversing the interior of a pipe comprising a pair of two-wheeled powered trucks each including a separate bolster to which its wheels are attached, the bolsters being attached to oppostie ends of a stretcher member so that the trucks travel along diametrically opposite paths on the pipe wall.

2. The vehicle of claim 1 in which each truck comprises a driving wheel and a swivelling wheel, the driving wheels being diagonally opposite each other.

3. The vehicle of claim 2 including means pivotally connecting each bolster at its center to an end of said stretcher and means for automatically equalizing the angles between said stretcher and driving wheel end of one bolster and said stretcher and swivelling wheel of the other bolster.

4. The vehicle of claims 1, 2 or 3 in which the driving wheels have a rim including segments which rotate about axes tangent to the median circumference of the rim.

5. The vehicle of claim 3 in which the means for automatically equalizing the angles comprise a first driving motor coupled to one said driving wheel, a second driving motor coupled to the other said driving wheel and means servo-connecting the first and second driving motors.

6. Apparatus of claim 1 in which the trucks are disposed in the same plane.

7. Apparatus of claim 1 including means carried by the stretcher member to rotate one truck with respect to the other about the axis of the stretcher member.

* * * * *

UNITED STATES PATENT AND TRADEMARK OFFICE
CERTIFICATE OF CORRECTION

PATENT NO. : 4,563,954

DATED : January 14, 1986

INVENTOR(S) : TOKUJI OKADA, TAKEO KANNADE

It is certified that error appears in the above-identified patent and that said Letters Patent is hereby corrected as shown below:

Column 2, line 40, change "$\theta_{62}$" to --$\theta_{\beta}$--.

Signed and Sealed this

Twenty-ninth Day of April 1986

[SEAL]

Attest:

DONALD J. QUIGG

Attesting Officer

Commissioner of Patents and Trademarks